Dec. 2, 1952 V. B. BUTLER ET AL 2,620,147
AIRPLANE FLAP CONTROL MECHANISM
Filed May 31, 1950 3 Sheets-Sheet 1
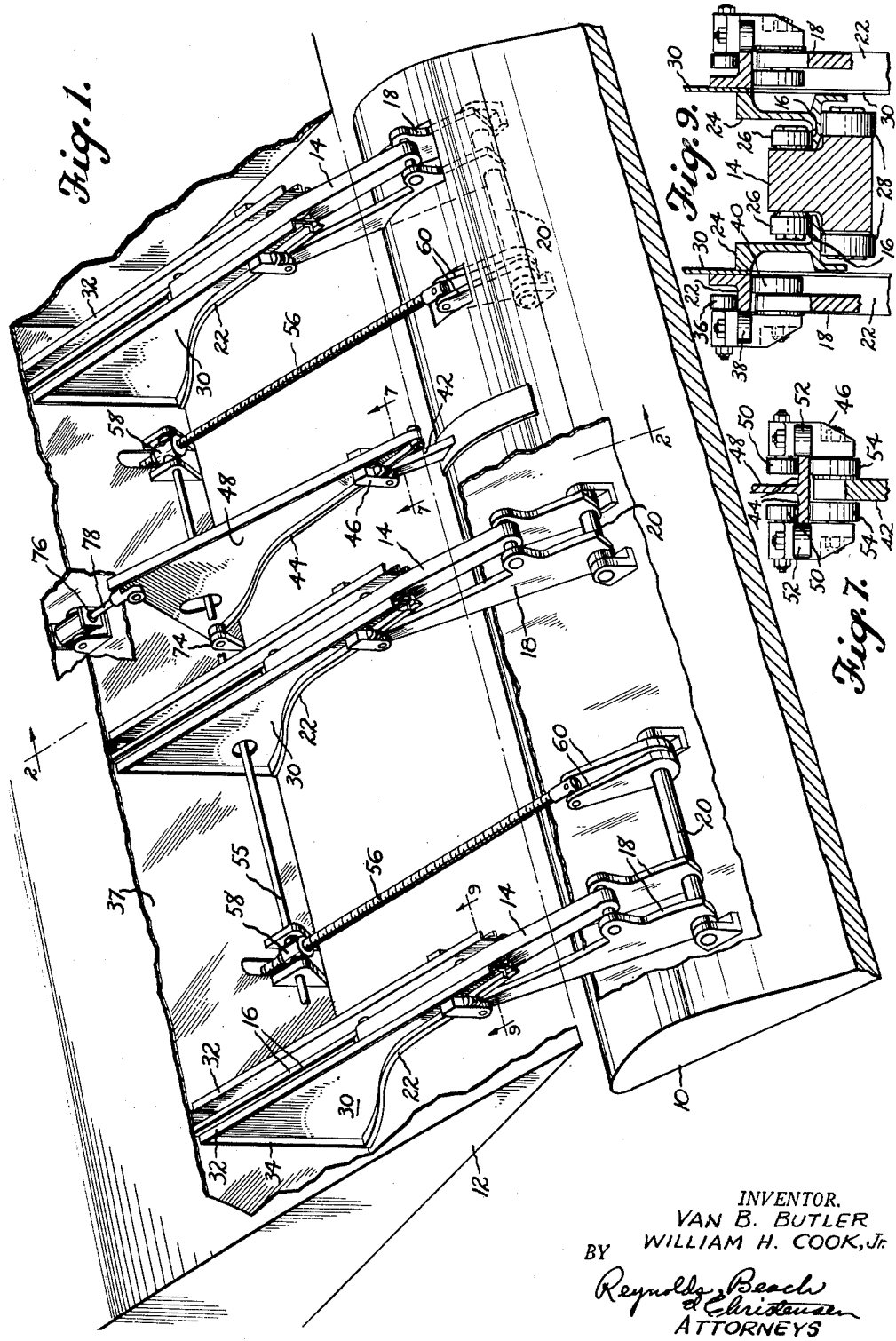
INVENTOR.
VAN B. BUTLER
WILLIAM H. COOK, Jr.
BY
Reynolds Beach
L Christensen
ATTORNEYS

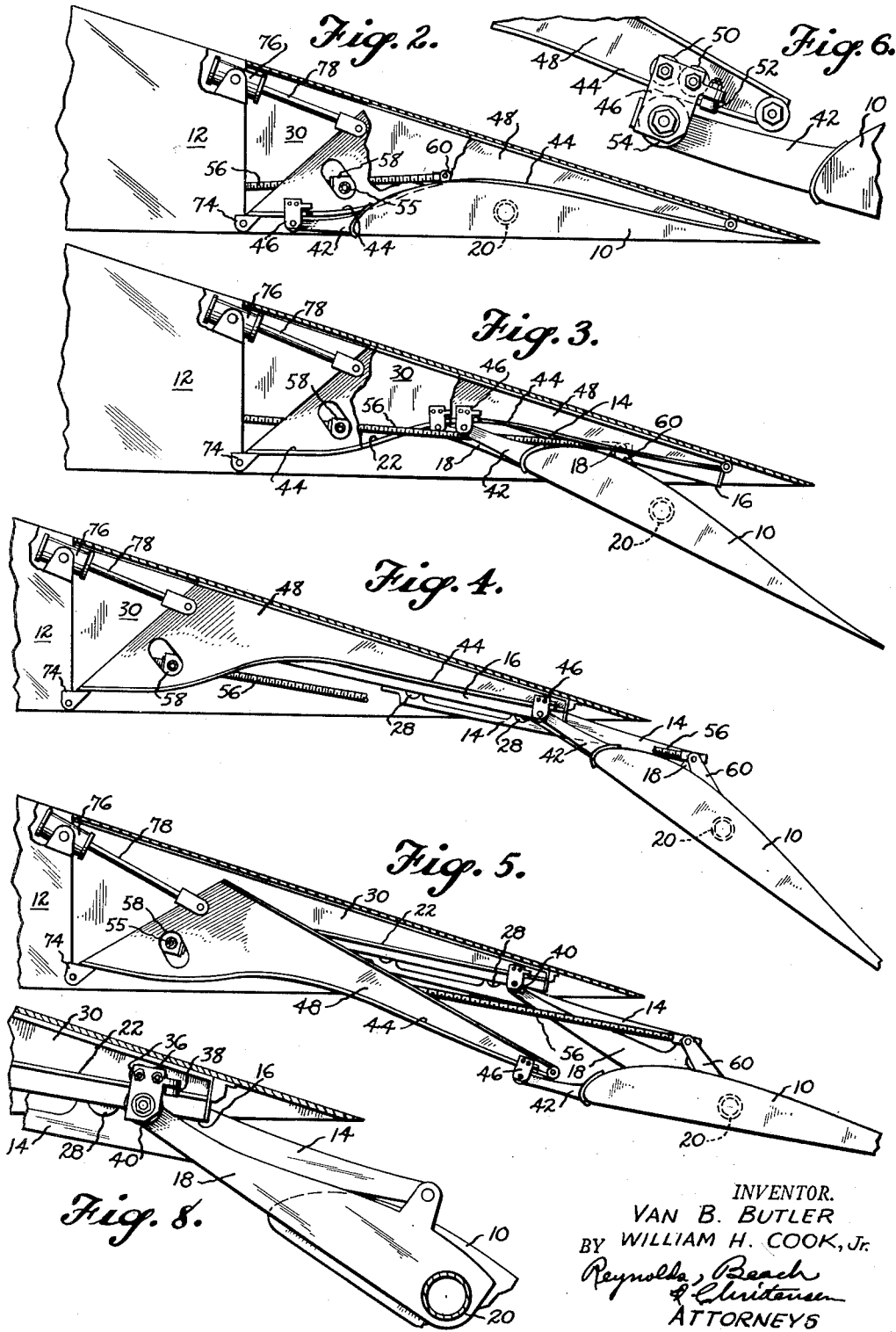

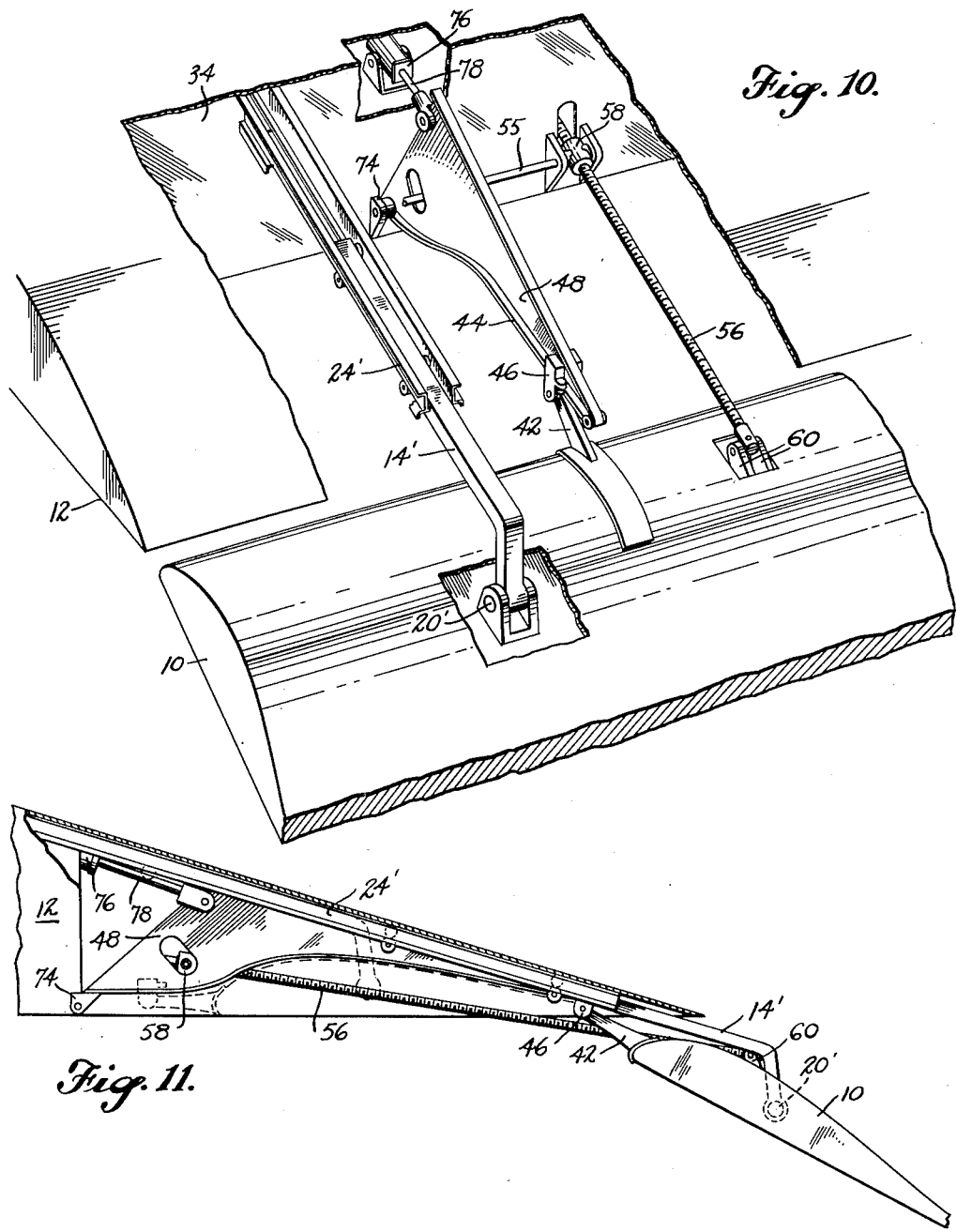

Patented Dec. 2, 1952

2,620,147

UNITED STATES PATENT OFFICE 2,620,147

AIRPLANE FLAP CONTROL MECHANISM

Van B. Butler, Mercer Island, and William H. Cook, Jr., Seattle, Wash., assignors to Boeing Airplane Company, Seattle, Wash., a corporation of Delaware Application May 31, 1950, Serial No. 165,296

5 Claims. (Cl. 244—42)

1

This invention relates to airplane wing flap control mechanism of the type operable in the projected position of the flap to vary its deflection angle for augmenting lateral control of the airplane at low speeds.

At the high speeds of modern airplanes lateral control is accomplished by ailerons or other devices, which may have comparatively small effectiveness at low speeds during takeoff and landing, and also in stalled flight. At the same time, however, the airplane must be capable of landing at speeds not excessively greater than the landing speeds of the older type airplane. As a result of this increasing differential between maximum flight speed and landing speed, accompanying advancements in the art, it has become increasingly more difficult to provide an airplane with adequate lateral control and stability at slow speeds, such as during landing. This is particularly so on swept wings, due to the effect of runway crosswinds or rolling moments, requiring high effectiveness of the lateral controls.

Our invention relates to flap control mechanism which is operable to control movement of the flap conjointly with the aileron, spoiler, or other lateral control device used in flaps-up flight, for instance during landing or at other times when the flap is projected. During landing and takeoff the flaps are normally lowered to provide maximum lift. If at that time one flap is swung upward or "spilled" as the corresponding aileron is swung upward, the lateral control effect of the ailerons is greatly augmented. In the practice of the invention preferably the flaps normally occupy their fully downward-projected positions to afford maximum lift effect, and only when an aileron is swung above its neutral position will the corresponding flap be swung out of its normal position, namely upward by a related amount. Preferably the opposite flap would then remain stationary.

An object of the present invention is to devise generally improved flap control mechanism which supports and guides a flap for projection and retraction, and also enables the flap in its projected position to be swung in controlled manner away from its normal or maximum angle of incidence.

Another object is to provide mechanism of this type which is simple and direct in operation, is of minimum weight and can be mounted conveniently in the wing without disturbing structural parts or control parts.

An advantage of the composite control mechanism is that the components controlling angle of incidence of the flap during its projection and retraction movements also serve as the mechanical medium or coupling through which flap angular displacement is controlled when the flap is fully projected. In this it is unnecessary to disconnect the flap from its normal projection and retraction guide mechanism before the flap angle can be changed in the projected position, or even when partly projected.

In one illustrated form of the composite control mechanism, briefly described, the flap is suspended by hinge supports connected to angularly controlled bell cranks which in turn are carried by separately guided cantilever carriage arms. The latter run on tracks for effecting bodily movement of the flap between its retracted and projected positions generally chordwise of the wing. Preferably during its chordwise movement toward projected position the flap is also progressively lowered by controlled rocking of the bell cranks, causing its hinge axis to follow a trajectory which curves downward to the rear. The flap's angle of incidence is controlled during this bodily movement by engagement between a control arm fixed to the flap, and a cam track of selected shape controlling flap angle as a desired function of bodily position. This cam track normally occupies a fixed position relative to the wing, but without severing its connection to the control arm can be swung or otherwise shifted into different positions to vary the angular displacement of the flap in accordance with operation of the lateral controls as desired.

In a second illustrated form the flap is suspended by hinge supports carried directly by the ends of respective carriage arms guided on generally straight, chordwise-extending tracks. In this case, since no bell cranks are interposed between flap and carriage arms, the pivot axis of the flap describes a generally straight-line trajectory in moving between the two extreme positions. As before, flap angle of incidence is controlled during this movement and in projected position of the flap by engagement between a control arm fixed to the flap, and a cam track of selected shape, the cam track being mounted for swinging as in the first-mentioned form.

These and other features, objects and advantages of the invention, including certain details of construction of its two illustrated forms will now be described in greater detail by reference to the accompanying drawings.

Figure 1 is an isometric view of a trailing edge portion of an airplane wing embodying a flap and flap control mechanism of the first form referred to above.

Figure 2 is a sectional view taken chordwise of the wing and showing parts of the flap control mechanism with the flap in retracted position, certain parts being broken away for purposes of illustration; Figure 3 is a similar view with the flap partly projected and with different parts of the mechanism broken away to reveal other details; Figure 4 is a similar view with the flap fully projected and in position of maximum downward angular displacement, various parts of the control mechanism being broken away to reveal other details; Figure 5 is a similar view with the flap fully projected but swung by the control mechanism toward the neutral or "spilled" position of the flap.

Figure 6 is a side view of the end portion of the cam track engaged by the follower on the control arm fixedly connected to the flap to control angular position thereof.

Figure 7 is a cross section of a portion of this cam track and showing the manner of its rolling engagement by the follower.

Figure 8 is a chordwise sectional view showing a cantilever carriage arm guided for movement along a straight track, and a bell crank interconnecting the carriage arm and the flap, and being guided by a curved cam track.

Figure 9 is a cross sectional view of the composite structure forming the last mentioned straight and curved cam tracks and showing the followers engaging the same.

Figure 10 is an isometric view similar to Figure 1, but showing a portion of the second-mentioned form of the flap control mechanism.

Figure 11 is a chordwise sectional view of this second form, such view showing the flap lowered and in fully projected position.

In Figures 1 to 9, inclusive, the flap 10 is supported and guided for bodily movement to and from its retracted position beneath the trailing edge portion of the wing 12 along a trajectory which curves downward to the rear. The weight of the flap is supported through bell cranks 18 by three cantilever carriage arms 14 spaced spanwise of the flap and guided on parallel straight tracks 16 for reciprocation generally chordwise of the wing. In supporting the flap the base ends of the bell cranks are rigidly connected to the shafts 20 journaled for rotation freely in the flap structure. The free ends of the carriage arms are pivotally connected to bell cranks 18 at locations forwardly of and above the hinge axis of the flap.

In the assembled positioned of the parts the bell cranks extend forwardly of the flap to engage and be guided for movement along curved tracks 22. These tracks are of a shape and location producing rocking of the guided bell cranks on their carriage arm pivots to raise and lower the flap in controlled manner relative to the straight line of movement of the ends of the carriage arms. Such rocking produces the desired trajectory curvature of the flap hinge axis during extension and retraction. In the illustrated case the nature of this trajectory may be seen by a comparison of Figure 2 in which the flap appears in retracted position, Figure 3 in which it has been moved rearward part way toward projected position and lowered in relation to the line of movement of the carriage arm 14, and Figure 4 in which it has reached the fully projected position.

A composite structure incorporating both the carriage arm tracks and the curved tracks controlling rocking of the bell cranks appears in Figure 9. The tracks 16 for each carriage arm are of double construction, being formed by flanges of the straight structural members 24 disposed in parallel relationship, track flanges projecting toward each other at a predetermined uniform close spacing. The base ends of the carriage arms 14 are received between these flanges and carry at spaced intervals along their lengths pairs of cooperative rollers, each pair including an upper roller 26 engaging the upper surface of a track flange and a lower roller 28 engaging the lower surface of the same track flange at a corresponding location. Structural members 24 in turn are supported by a structure including parallel vertical plates 30 provided with flanges 32 (Figure 1) at their upper edges for attachment to the skin of the wing, and flanges 34 at their forward edges for attachment to the rear wing spar or bulkhead 37. Also additional means of support for these plates and the tracks may be provided.

The curved tracks 22 guiding the forward ends of the bell cranks are formed by the outwardly projecting flanges of structural angles secured along the lower edges of the plates 30 as shown. The shape of curvature of these tracks may be readily computed to provide any of various flap axis curved trajectories according to particular design requirements, as later mentioned. The track flanges 22 are each engaged by three rollers 36, 38 and 40 arranged to contact respectively the upper surface of the flange, its side edge and its lower surface, as shown in Figure 9, in order to provide both lateral and vertical stability and to maintain the interengagement with the track despite any tendency for the bell cranks to be swung independently by forced acting on the flap. However, the axles of rollers 40 compositely form a bell crank pivot, the forward arms of the bell crank being journalled on them so that the angle defined between such bell crank arms and the portion of track engaged by their followers may vary without binding of the rollers.

In addition to the mechanism supporting and guiding the flap for bodily movement between its projected and retracted positions, the flap control mechanism further comprises means to progressively increase its angular deflection downward as it moves toward projected position, preferably in the manner seen from a further comparison of Figures 2, 3 and 4. Such a means controlling flap angle in relation to bodily movement preferably comprises a control arm 42 connected rigidly to the flap and projecting forwardly therefrom to be guided from a curved track 44, the end of such arm having a carriage or follower 46 which rides on the track. During flap extension and retraction this track normally is held stationary, although it can be shifted in a manner later described. As shown in Figure 7, this track is also of double construction, being formed by oppositely projecting flanges on the lower edge of the structural plate 48. The follower 46 includes two groups of rollers, one at each side of plate 48 and each group including three rollers 50, 52 and 54 engaging respectively the top, side and bottom surfaces of the corresponding track flange 44, as shown. As in the case of the bell crank arms guided from the curved tracks 22, the flap control arm 42 is constrained by its rollers to follow the track 44 despite the effect of wind forces on the flap tending to change its angle of tilt. Moreover, the axle of rollers 54 serves as a pivot for the forward end of the control arm 42 so that its angular relationship to the track portion of plate 48 can vary without binding of the rollers.

It will be seen from the drawings that the tracks 22 and 44 in the illustrated case are substantially of the same shape. This is not essential in a particular design, however, because, as will be evident, a particular trajectory of the flap's hinge axis will be established by a differently shaped track if the lengths of the bell cranks 18 are changed, for example. Similarly, the shape of the track 44 to produce a given flap angle for each position of the flap in its bodily movement between extreme positions will depend upon the length of the control arm 42, for example. The shapes and relationship of the tracks in a given instance will depend upon aerodynamic considerations and mechanical clearance of the flap from other parts of the wing during flap extension and retraction. If, however, the pivot for the forward ends of the bell cranks 18 formed by the axles of rollers 40 are substantially aligned with the pivot axis for the forward ends of arms 42 formed by the axles of rollers 54 when the plates 48 are in their normal positions, the tracks 22 can be made of substantially the same shape as the tracks 44. In that event no appreciable relative movement will occur between the bell cranks 18 and the flap during projection and retraction of the flap, as is indicated by a comparison of the bell crank and flap relationships shown in Figures 2, 3 and 4.

The flap is moved between its projected and retracted positions by suitable mechanism such as the coacting screw jacks 56. These are extended and retracted in their respective actuating nut units 58 driven in common by a power shaft 55 connected to any suitable source of drive power (not shown). At their extreme rearward ends they are pivotally interconnected with the lever arms 60, while such arms are rigidly connected at their base ends to the rotatable shafts 20. The top of the flap is apertured for clearance of these lever arms which project generally forwardly and upward to offset locations above the general flap surface for connection to the screw jacks, as shown at the lower right in Figure 1. Because the lever arms 60 and the bell cranks 18 are both rigidly connected to the shafts 20, and the flap is rotatable on these shafts by swinging of levers 42, bodily extension and retraction of the flap and angular positioning thereof with respect to such shafts are independently controlled.

According to the invention the separate means controlling flap angle during extension and retraction is also independently movable in the projected position of the flap to enable spilling the flap by controlled amounts in accordance with operation of the lateral controls of the airplane. In a control mechanism which separates the functions of positioning the flap bodily from positioning it angularly, the cam track arrangement, including the cam track 44, the follower 46 and the control arm 42, is ideal to effect such a coordination with the lateral controls, because it is merely necessary in that case to mount the cam track structure for movement by its forward end to swing the control arm 42 in order to vary the flap angle. In the preferred case the lower forward edge of the cam track supporting plate 48 is pivoted on the support 74 fixed to the wing, and is swung on this pivot by a double-acting hydraulic jack 76 suitably controlled in accordance with operation of the lateral controls (not shown) of the airplane. Normally, that is, as long as the ailerons are not swung from their neutral positions, the hydraulic jack's piston rod 78 connected to the track support 48 will be held fixedly retracted and will remain so even in the projected position of the flap when the ailerons are swung to effect lateral control; however, the control mechanism will effect spilling of the flap corresponding to the upwardly swung aileron in aid of control by the ailerons.

It will be evident that, irrespective of the type of flap supporting mechanism employed, the tilting of the flap in projected position unaccompanied by chordwise translation is effected simply by movement of the same flap-tilting mechanism as controls flap angle during extension and retraction of the flap. Where the flap-tilting mechanism comprises a track, the track may be moved bodily, or may be swung by suitable mechanism to effect supplemental lateral control by flap tilting. Swinging of the track by its forward end is preferred over other ways of moving it for lateral control purposes, because in achieving a given amount of displacement of its rearward portion the forward portion of the flap requires comparatively small clearance for movement in that situation, thereby meeting space limitations better than if the whole track were to move bodily up or down.

Also, while hydraulic jacks are shown as typical track-swinging mechanism, any other suitable mechanism may be substituted for them to effect swinging of the cam track 44.

With our invention, control tilting of the flap may be accomplished without the necessity of disconnecting any parts or otherwise rendering inoperative any of the mechanism used to project and retract the flap. The composite control mechanism effecting both chordwise movement and the angular control movement of the flap, while simple in construction, is always in condition for effecting either type of flap movement. Moreover, it is obvious that the flap may be tilted to supplement lateral control of the ailerons in any of the flap's positions during extension and retraction, where suitable mechanical clearances are provided, although in the illustrated cases such lateral control operation is contemplated only with the flap substantially fully extended.

The second illustrated form of the invention shown in Figures 10 and 11 is simpler than the first form already described and for that reason will be preferable in various types of installations. In this case, the flap 10 is suspended bodily on a pivot pin 20' carried directly by the downturned end of each cantilever carriage arm 14' instead of by a bell crank arrangement interposed between the flap and a cantilever carriage arm as in the previous case. One of these carriage arms is shown in Figure 10 as being guided by a straight track structure 24' of double construction resembling the track structure 24 shown in Figure 9 and other figures pertaining to the first form. Such track structure extends generally chordwise of the wing and serves to guide the flap for bodily translation wherein its pivotal support follows straight-line trajectory during the extension and retraction of the flap relative to the wing 12. The details of the supporting structure for the double track 24' are not shown, being subject to variation with different installation design requirements.

The screwjack mechanism 56, 58 and 60 operable for extension and retraction of the flap is similar to that already described, as is the important control mechanism including arm 42 and track 44 for guiding the flap in angle during bodily extension and retraction and for adjustably tilting the flap in its projected position as well as in intermediate positions if desired. The same numerals are applied to parts in Figures 10 and 11 which correspond to similar numbered parts in the previous figures.

In Figure 11 the flap and cantilever supporting arm are shown by solid lines in the projected and lowered position of the flap and by dotted lines in the flap-retracted position. Operation of the actuator 76 to swing the cam track 44 as previously, will cause the flap to tilt about its pivot axis when in projected position or, if desired, when in various intermediate positions between its extreme limits of travel.

We claim as our invention:

1. Wing flap control mechanism comprising means carried by the wing pivotally supporting the flap and guiding it for bodily movement relative to the wing between projected and retracted positions, means comprising a curved cam-track extending generally chordwise of the wing, and a follower rigidly supported from the flap and engaging said track for guidance along the same and thereby controlling angular positioning of the flap relative to the wing in accordance with track curvature during bodily flap movement, means on the wing supporting and guiding said cam track for shifting generally transversely to the general plane of the wing of its portion engaged by said follower in the projected position of the flap to alter the flap's angle of incidence in such projected position, and means operable to actuate said track supporting and guiding means to effect such track shifting.

2. The wing flap control mechanism defined in claim 1 wherein the cam track supporting and guiding means comprises a pivotal connection between the cam track and wing for swinging of the cam track about a spanwise axis, and an arm rigidly mounted on the flap and carrying the follower at such a position forward of the flap's pivot axis as to locate the follower at the aft portion of the cam track when the flap is in its fully projected position.

3. The wing flap control mechanism defined in claim 2, wherein the means supporting and guiding the flap for bodily movement comprises a first track extending generally chordwise of the wing, an arm supported by and guided for movement along said track and projecting as a cantilever therefrom over the flap, a bell crank having a first arm pivotally interconnecting the flap and the end of said cantilever arm to carry the weight of the flap, said bell crank having a second arm projecting forwardly of the flap, a second track extending generally chordwise of the wing, and a follower engaging said second track and carried by the end of the second bell crank arm to control swinging of said latter arm, hence vertical positioning of the flap relative to said first track during bodily movement of the flap.

4. Wing flap control mechanism comprising a stationary track carried by the wing, an arm having one end pivotally connected to the flap and a follower carried by its other end and guided by said track for movement therealong during projecting and retracting translation of the flap, a second track swingably mounted on the wing and having a predetermined curvature, an arm rigidly mounted on the flap and carrying a follower engaging said second track and guided thereby to control the angle of flap incidence in accordance with said track curvature during projection and retraction thereof, and means operable to swing said second track to alter the angle of incidence of the flap in a given translative position thereof.

5. Wing flap control mechanism comprising means carried by the wing pivotally supporting the flap and guiding it for bodily movement relative to the wing between projected and retracted position, and flap tilting means comprising a generally chordwise-extending elongated guide member of predetermined curvature pivotally supported by a forward portion thereof in the wing for swinging about a generally spanwise-extending axis, a flap control arm projecting forwardly from the flap, means pivotally and guidingly connecting the forward end of said control arm to said guide member for guiding of such arm along said guide member to vary the flap's angle of incidence in accordance with such curvature during projection and retraction of the flap, and guide-member actuating means operable to swing said guide member about its pivot and thereby control angle of incidence of the flap in the projected position thereof.

VAN B. BUTLER.
WILLIAM H. COOK, Jr.

REFERENCES CITED

The following references are of record in the file of this patent:

UNITED STATES PATENTS

| Number | Name | Date |
|--------|------|------|
| 2,188,083 | Koppen | Jan. 23, 1940 |
| 2,202,430 | Rebeski | May 28, 1940 |
| 2,348,150 | Richter | May 2, 1944 |

FOREIGN PATENTS

| Number | Country | Date |
|--------|---------|------|
| 511,003 | Great Britain | Aug. 11, 1939 |